United States Patent [19]

Murakami et al.

[11] Patent Number: 4,956,526
[45] Date of Patent: Sep. 11, 1990

[54] DIGITIZER HAVING FLAT TABLET WITH MAGNETIC SHIELD PLATE

[75] Inventors: Azuma Murakami; Yasuhiro Fukuzaki, both of Kitakatsusikagun, Japan

[73] Assignees: Kabushikikaisha Wacom; NKK Corporation, both of Japan

[21] Appl. No.: 381,757

[22] Filed: Jul. 18, 1989

[51] Int. Cl.$^5$ .................................... G08C 21/00
[52] U.S. Cl. .................................................. 178/18
[58] Field of Search ................................ 178/18, 19

[56] References Cited

U.S. PATENT DOCUMENTS

| | | | |
|---|---|---|---|
| 4,645,869 | 2/1987 | Rockwell et al. | 178/19 |
| 4,848,496 | 7/1989 | Murakami et al. | 178/19 |

*Primary Examiner*—Stafford D. Schreyer
*Attorney, Agent, or Firm*—Bruce L. Adams; Van C. Wilks

[57] ABSTRACT

A digitizer for determining coordinate value of a point designated on a given two-dimensional coordinate plane. A pointing instrument is manually operable to designate a point on the given two-dimensional coordinate plane of a tablet. The tablet includes a flat sensor defining the given two-dimensional coordinate plane and operative for transmitting magnetic signal between the flat sensor and the pointing instrument disposed thereon to detect the designated point to thereby produce a detection signal, and a shielding plate disposed under the flat sensor to magnetically shield the flat sensor. The shielding plate is composed of silicon steel containing 4.0 to 7.0 weight % of silicon. A processing circuit is connected to the flat sensor for processing the detection signal to determine the coordinate value of the designated point.

14 Claims, 11 Drawing Sheets

DIGITIZER HAVING FLAT TABLET WITH MAGNETIC SHIELD PLATE

BACKGROUND OF THE INVENTION

The present invention relates to a digitizer of the type having a flat tablet operative to electromagnetically or magnetically detect a given point thereon inputted by means of a pointing tool so as to designate a two-dimensional coordinate value to the given point to thereby effect digitization of inputted graphic information.

In the conventional digitizer of this type, the tablet has a flat electromagnetic or magnetic sensor, and a shield plate is disposed under the flat sensor to block incidental disturbing electromagnetic waves or geomagnetism, which would affect sensitivity of the flat sensor.

However, in the conventional structure, if the flat sensor and the shield plate are disposed too close to each other, the magnitude level of detection signal produced by the flat sensor is reduced to thereby hamper the effective detection of inputted points. Thus, the conventional structure has the drawback that the total thickness of the tablet cannot be minimized because they must be spaced from each other.

SUMMARY OF THE INVENTION

In view of the above mentioned drawback of the conventional structure of tablet, an object of the present invention is to provide an improved shielding structure of the digitizer effective to minimize the total thickness thereof. According to the present invention, the digitizer is comprised of a tablet having a flat sensor, a pointing tool operable to transmit an electromagnetic or magnetic signal between the sensor and pointing tool to thereby designate a given point on the flat sensor, and a processing circuit connected at least to the tablet for processing the transmitted signal so as to determine the coordinate value of the designated point. A shielding plate composed of silicon steel containing 4.0 to 7.0 weight % of silicon is disposed under the flat sensor of the tablet.

In the inventive digitizer, the shielding plate disposed under the tablet sensor can block incidental disturbing electromagnetic waves and geomagnetism. More importantly, the shielding plate is composed of silicon steel containing 4.0 to 7.0 weight % of silicon. Such composition does not cause substantial attenuation of the electromagnetic or magnetic signal transmitted between the sensor and pointing tool so that the shielding plate is disposed in contact with rear face of the flat sensor to thereby reduce the total thickness of the tablet.

DETAILED DESCRIPTION OF THE INVENTION

Hereinafter, the preferred embodiments of the present invention will be described in conjunction with the attached drawings.

Figure 1:
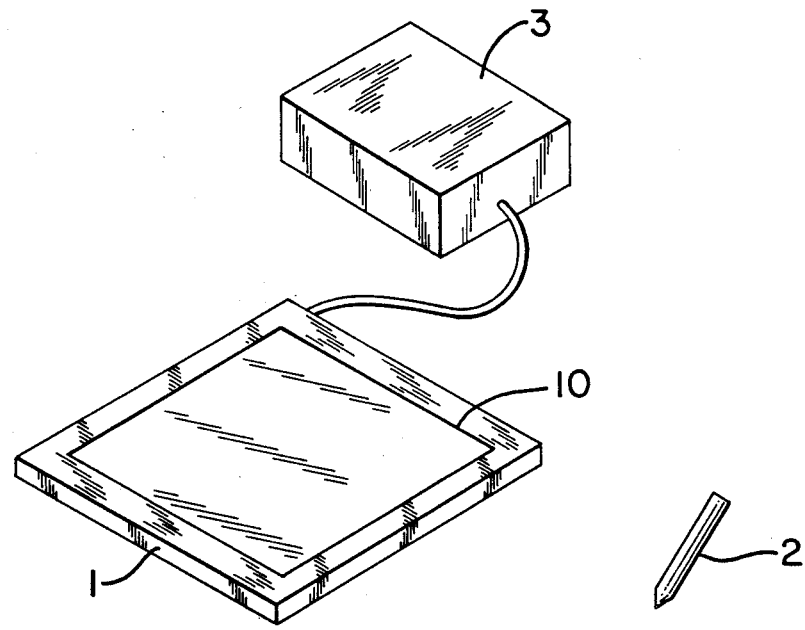
FIG. 1 is a perspective view of the digitizer according to the present invention.

FIG. 1 is a perspective view of the digitizer according to the present invention. The digitizer is comprised of a tablet 1 defining thereon a two dimensional coordinate system of X and Y and being provided with a flat sensor for detecting a point designated on the tablet 1, a pointing tool or instrument such as a stylus pen 2 for manually designating or inputting a desired point while transmitting or exchanging an electromagnetic or magnetic signal between the pen 2 and the flat sensor so that the inputted point is detected by the sensor; and a processing circuit 3 connected to the tablet 2 for receiving therefrom a detection signal to process the same to thereby determine the coordinate value of the detected point on the tablet.

Figure 2A:
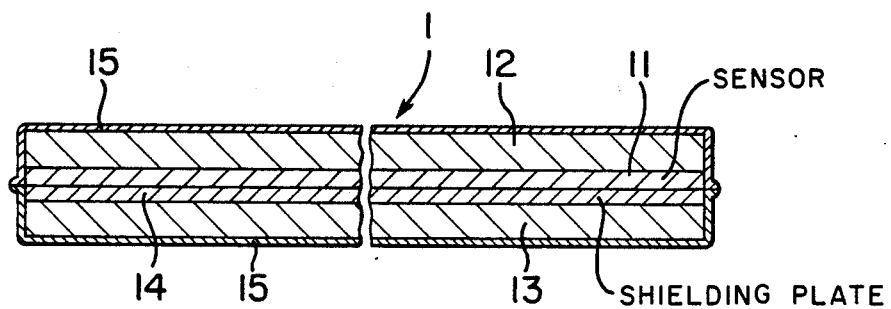
FIG. 2A is a sectional view of a tablet in the inventive digitizer.

FIG. 2A is a sectional view of the tablet 1 of multi-layer structure. The tablet 1 is comprised of a flat sensor 11 having thickness of about 0.8 mm, a pair of upper and lower reinforcement plates 12 and 13 having thickness of about 2 mm, made of acryl resin or vinyl chloride resin, and disposed on opposite sides of the flat sensor 11. A shielding plate 14 is interposed between the flat sensor 11 and the lower reinforcement plate 13 in contact with the bottom face of sensor 11. The shielding plate 14 has thickness of about 0.35 mm and is composed of silicon-containing steel containing 6.5 weight % of silicon. This multi-layer structure is laminated or covered with vinyl plastic film 15 such that the tablet has the total thickness of more or less 5 mm.

Figure 11:
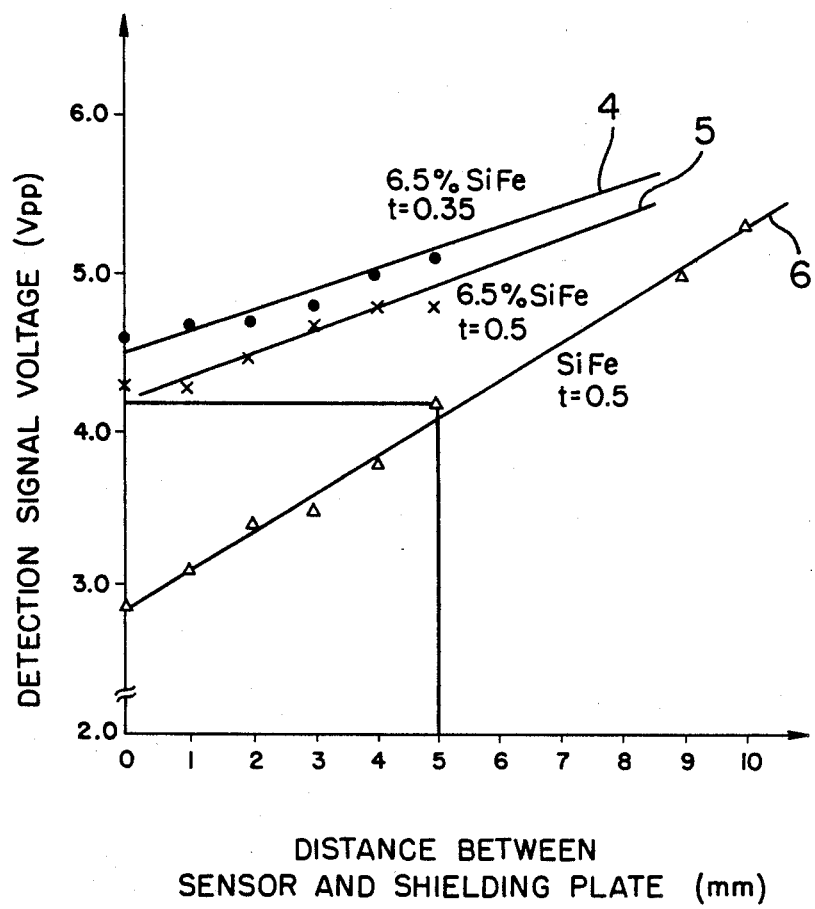
FIG. 11 is a graph showing the relation between the magnitude of detection signal voltage and the distance from the shielding plate to the flat sensor.
Figure 12:
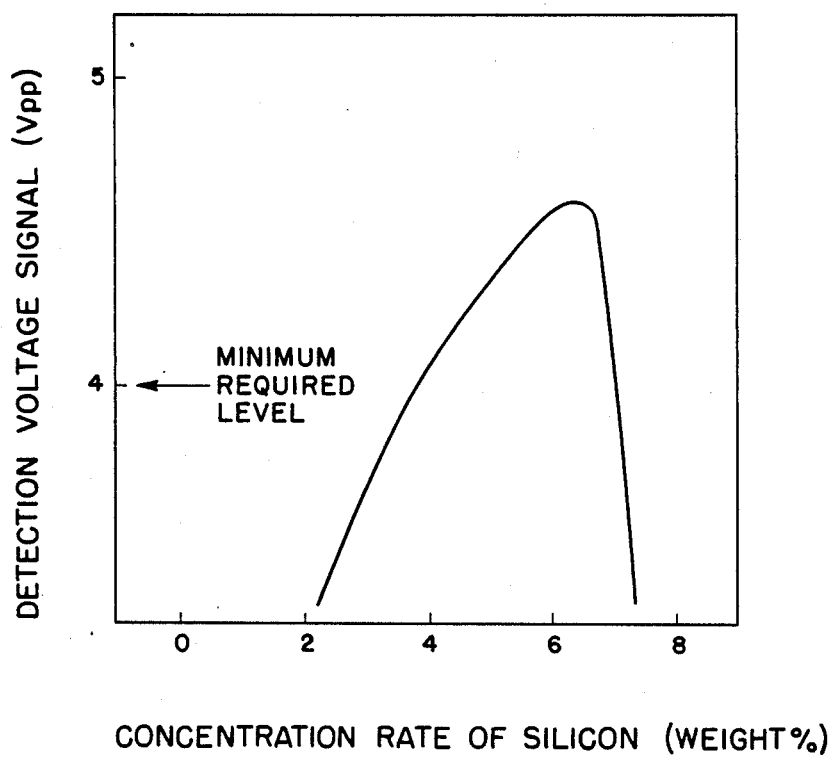
FIG. 12 is a graph showing the relation between the magnitude of detection signal voltage and the concentration rate of silicon contained in steel material of the shielding plate.

An experiment has been undertaken to determine optimum dimensional and compositional parameters of the shielding plate. The experimental result is shown in FIGS. 11 and 12. FIG. 11 illustrates the relation between the voltage magnitude of the detection signal produced in the flat sensor and the gap distance from the flat sensor to the shielding plate for three different types of shielding plates. In the figure, line 4 shows the measured relation of a first shielding plate sample having the thickness of 0.35 mm and made of silicon steel containing 6.5 weight % of silicon, line 5 shows the measured relation of a second shielding plate sample having the thickness of 0.5 mm and made of silicon steel containing 6.5 weight % of silicon, and line 6 shows the measured relation of a third shielding plate sample having the thickness of 0.5 mm and made of the conventional silicon steel containing 3.5 weight % of silicon. The composition and magnetic characteristics of these three samples are represented in the following table.

| Sample No. | composition (weight %) | | | | | | magnetic characteristic | | |
|---|---|---|---|---|---|---|---|---|---|
| | C | Si | Mn | N | O | Sol. Al | Magnetic permeability | Iron loss W2/10000 | relative resistivity |
| 1 | 0.003 | 6.65 | 0.05 | 0.003 | 0.002 | 0.01 | 51000 μ | 48 W/kg | 82 μΩcm |
| 2 | 0.003 | 6.65 | 0.05 | 0.003 | 0.002 | 0.01 | 51000 μ | 73 W/kg | 82 μΩcm |
| 3 | 0.003 | 3.51 | 0.20 | 0.002 | 0.002 | 0.37 | 7800 μ | 150 W/kg | 42 μΩcm |

According to the graph shown FIG. 11, the voltage magnitude of the detection signal is proportional to the gap distance between the flat sensor and shielding plate for the respective samples through the proportional constants are different due to their magnetic attenuating features for the electromagnetic or magnetic signal transmitted between the stylus pen and tablet. The conventional shielding plate of the third sample (line b) must be separated from the flat sensor a distance of more than 5 mm so as to obtain the sufficient voltage magnitude of detection signal of more than 4.0 Vpp. On the other hand, the inventive shielding plates of the first and second samples (lines 4 and 5) can be disposed in contact with the flat sensor while the voltage magnitude of detection signal is maintained more than 4.0 Vpp.

FIG. 12 shows the relation between the voltage magnitude of the detection signal and the concentration rate of silicon contained in the shielding plate. The detection voltage is measured while the shielding plate is attached in contact with the flat sensor. The shielding plate has the thickness of 0.35 mm. As seen from FIG. 12, the detection signal has a voltage magnitude greater than 4 Vpp of the minimum needed value when the attached shielding plate of steel contains silicon in the range of 4.0 to 7.0 weight %.

In addition, in order to improve the magnetic characteristics such as magnetic shielding ability, it is expedient to add metal elements such as Ni, Co and Al into the steel material of the shielding plate. For the same purpose, it is also expedient to limit the concentration of trace components such as C≦0.01 weight %, Mn≦0.3 weight %, P≦0.1 weight %, S≦0.02 weight %, N≦0.01 weight % and O≦0.01 weight %.

Figure 2B:
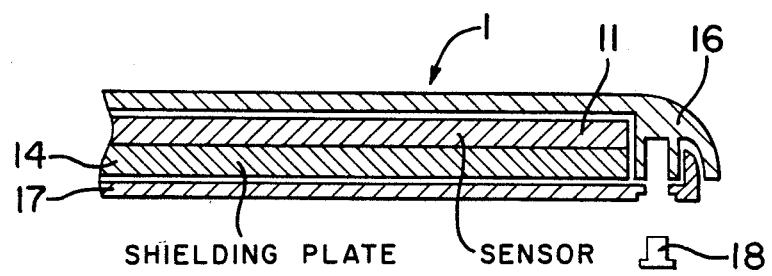
FIG. 2B is a sectional view of another tablet in the inventive digitizer.

FIG. 2B is a sectional view of another embodiment of the inventive tablet. The tablet 1 is comprised of a flat sensor 11 made of, for example, glass epoxy substrate and a shielding plate 14 composed of silicon steel containing 4.0 to 7.0 weight % of silicon. The shielding plate 14 is attached in contact with a rear face of the flat sensor 11. However, the shielding plate 14 may be spaced from the flat sensor 11 a distance less than 5 mm or preferrably less than 3 mm or optimumly less than 1 mm. In such case, a cushion plate made of plastic (not shown) may be interposed between the flat sensor 11 and the shielding plate 14. The double layer structure of the flat sensor 11 and shielding plate 14 is sandwiched by a top frame 16 made of, for example, ABS plastic and a bottom reinforcement plate 17 made of aluminium. The top frame 16 and the bottom plate 17 are secured to each other by means of screws 18.

Figure 3:
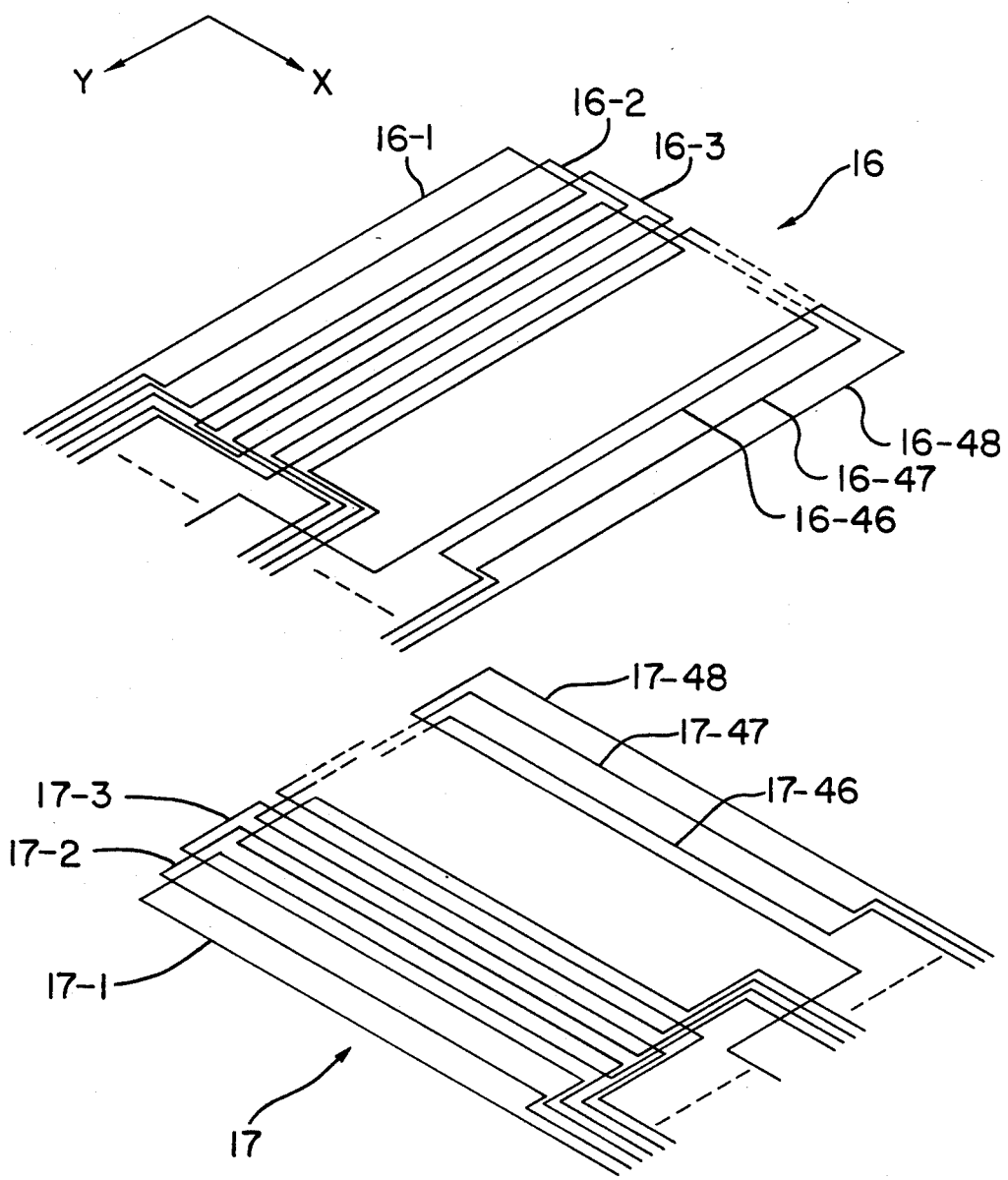
FIG. 3 is a schematic view of loop coils in a flat sensor of the tablet.

FIG. 3 shows an arrangement of a pair of X and Y loop coil groups 16 and 17 provided in the flat sensor 11. The X loop coil group 16 is comprised of a plurality of, for example, 48 number of loop coils 16-1, 16-2, ... , 16-48 having generally elongated shape in the Y direction, disposed in parallel to each other, and overlapped partly to each other in the X direction. The Y loop coil group 17 is comprised, in similar manner, of a plurality of, for example, 48 number of elongated loop coils 17-1, 17-2, ... , 17-48 extending in parallel to each other in the X direction and arranged in overlapped relation to each other in the Y direction. The pair of X and Y loop coil groups 16 and 17 are superposed to each other in intersecting relation (though, the two groups are separated from each other in FIG. 3 for the easy understanding of loop coil arrangement). For example, the pair of loop coil groups 16 and 17 are formed as a printed electrode pattern on the opposite faces of a single circuit board. Each loop coil may be composed of a single turn or a plurality of turns to increase the magnetic sensitivity thereof.

Figure 4:
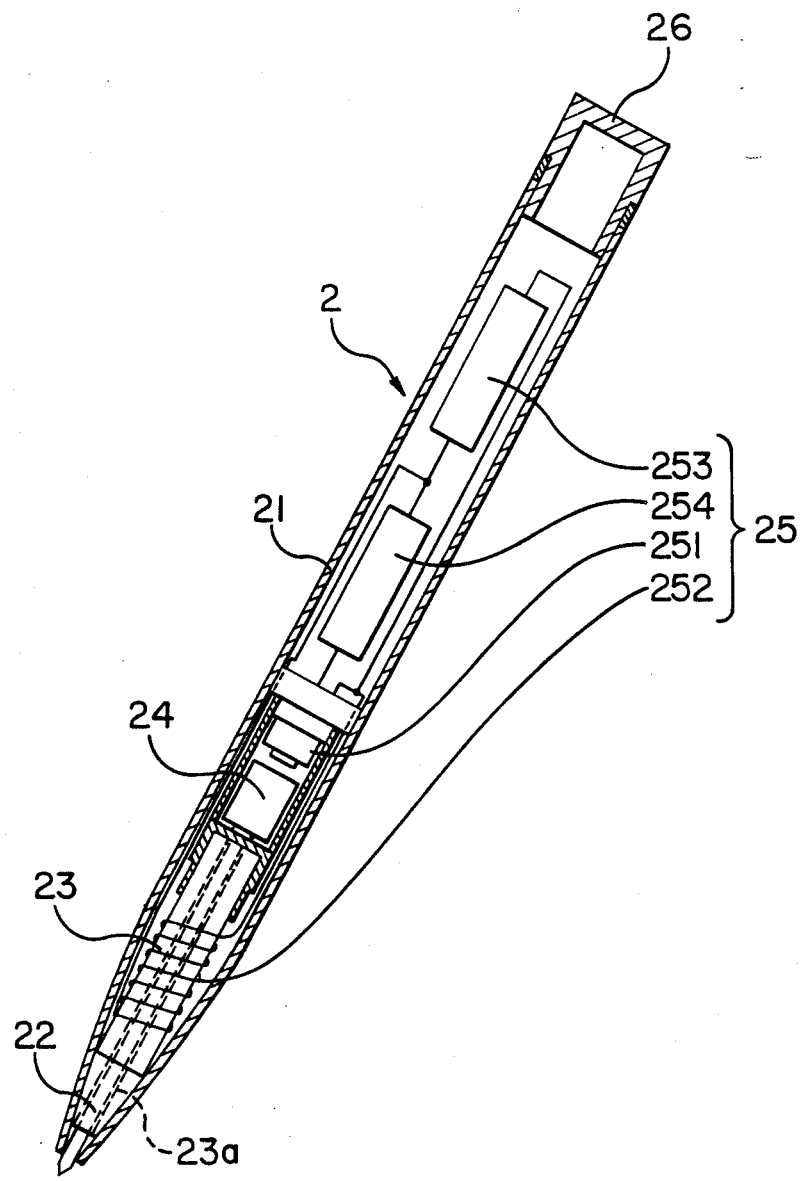
FIG. 4 is a sectional view of a stylus pen used in combination with the tablet.

FIG. 4 shows a detailed internal structure of the stylus pen 2 (hereinafter, simply referred to as "pen"). The pen 2 is comprised of a casing 21 composed of nonmetalic material such as plastic. The casing 21 contains therein a shaft 22 comprised of such as pin point stylus shaft disposed at the tip end portion thereof, a ferrite core member 23 having a throughhole 23a for slideably receiving the shaft 22, a coil spring 24 disposed adjacent to the rear end of the shaft 22, a resonating circuit block 25, and a cap 26 disposed on the rear end of casing 21 to seal the same. The resonating circuit block 25 is comprised of a switch 251 actuatable through the coil spring 24, a coil element 252 wound around the ferrite core member 23, and a pair of capacitors 253 and 254.

Figure 5:
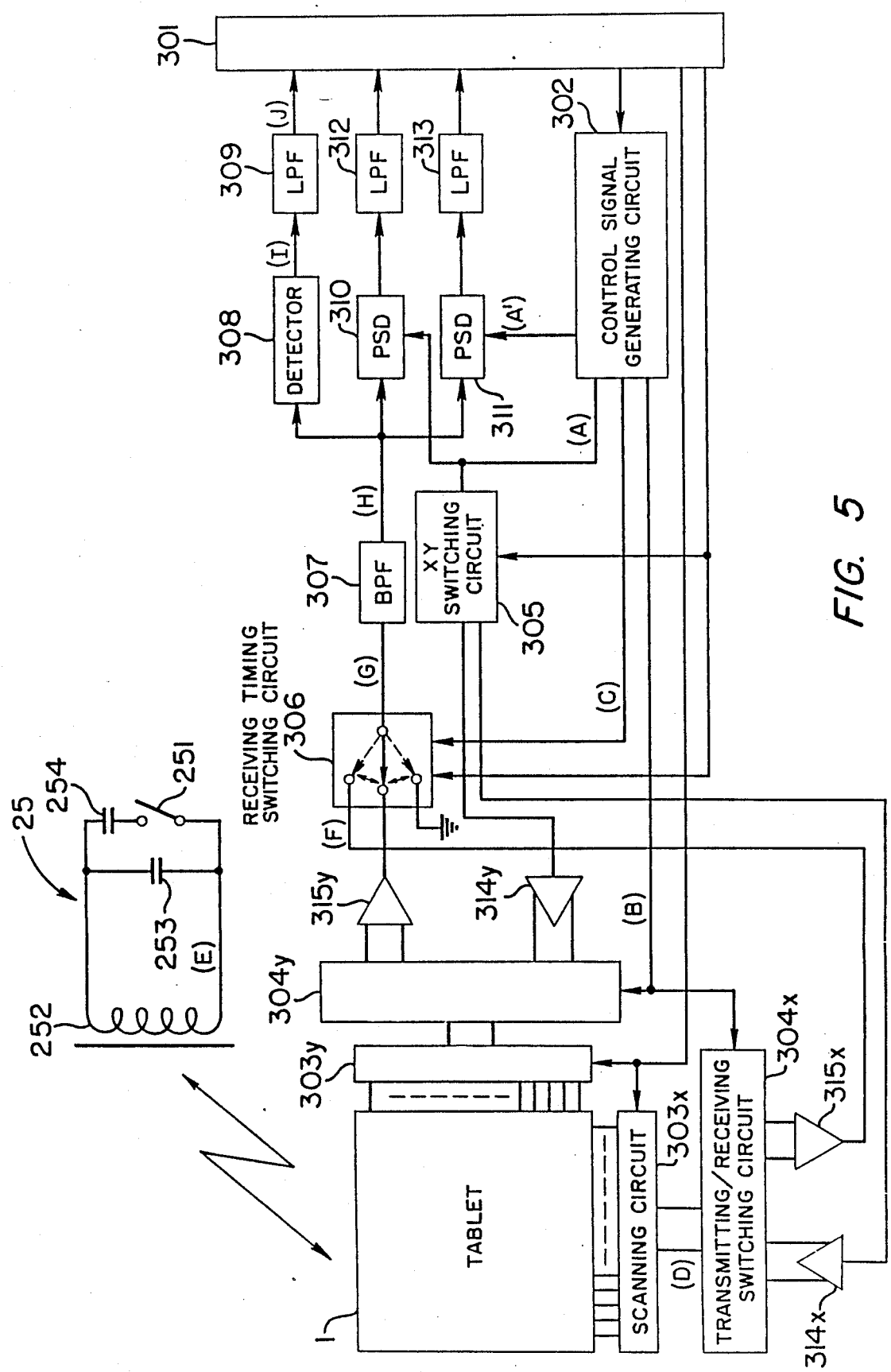
FIG. 5 is a circuit diagram of a resonating circuit provided in the pen and a processing circuit connected to the tablet.

As shown in FIG. 5, the capacitors 253 and 254 are connected in parallel to each other and constitute a resonating circuit together with the coil element 252. The capacitance C of capacitor 253 and the inductance of coil element 252 are suitably selected so as to determine a given natural frequency $fo = 2\pi/\sqrt{LC}$ such that the resonating circuit 25 undergoes resonating oscillation in which voltage and current are phase-matched to each other. The other capacitor 254 is connectable in parallel to the capacitor 253 upon actuation of the switch 251, effective to delay the phase of current in the resonating circuit 25 to thereby operate to delay the phase of the electromagnetic wave signal emitted from the resonating circuit 25 of pen 2 at a given phase angle. In addition, in order to turn on the switch 251, the tip end of the shaft 22 is pressed onto the top face of tablet 1 by holding manually the pen casing 21 so as to retract the shaft 22 into the casing 21 so that the switch 251 is pressed by the rear end of shaft 22 through the intermediate coil spring 24 to actuate the switch 251.

FIG. 5 shows a detailed circuit structure of the processing circuit 3 connected to the tablet 1 as well as the resonating circuit 25. In the figure, the processing circuit 3 is comprised of a control circuit 301, a control signal generating circuit 302, and a pair of scanning circuits 303x and 303y for scanning the X loop coil group 16 and Y loop coil group 17, respectively. Further, the processing circuit 3 includes switching means comprised of a pair of transmitting/receiving switching circuits 304x and 304y, an X/Y switching circuit 305, and a signal receiving timing switching circuit 306. A band pass filter 307 (BPF) is connected to the switching circuit 306 to constitute signal analyzing means. A detector 308 and a low pass filter 309 (LPF) are connected in series to the BPF 307 to constitute coordinate determination means together with the processing section of the control circuit 301. Phase detectors 310 and 311 (PSD) and low pas filters 312 and 313 constitute recognizing means for recognizing the ON/OFF state of the switch 251 in combination with the processing section of the control circuit 301. The processing circuit 3 further includes driving circuits 314x and 314y, and amplifier circuits 315x and 315y.

Next, the operation of the digitizer is explained hereinbelow. Firstly, description is given for the manner by which an electromagnetic wave signal is transmitted between the tablet 1 and pen 2 so as to produce an electric detection signal indicative of designated points on the tablet, with reference to signal waveforms shown in FIG. 6.

Figure 7:
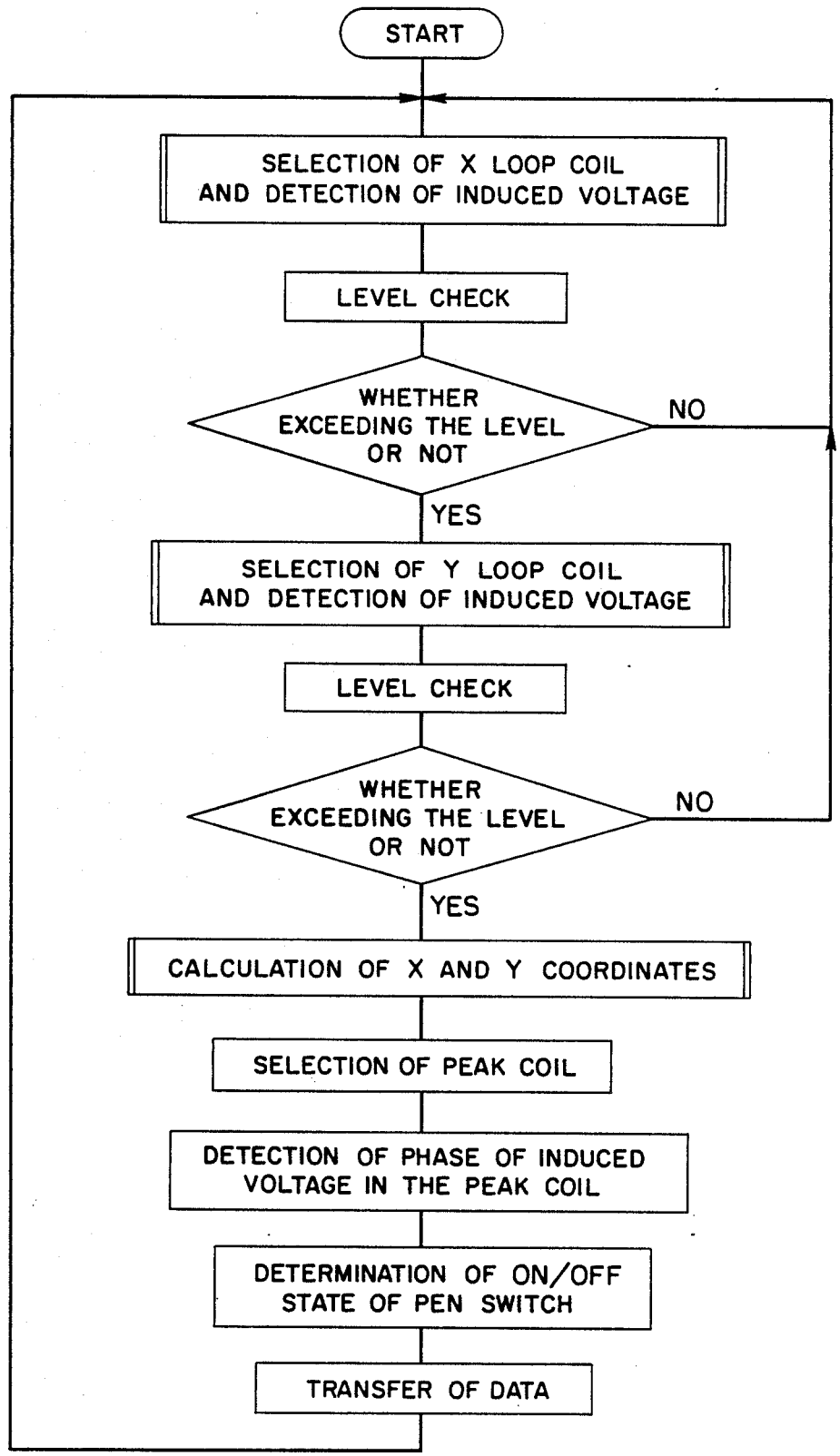
FIG. 7 is a flow chart showing the operation of processing circuit.

The control circuit 301 is composed of a microprocessor and is operative to control the control signal generating circuit 302. Further, according to the flow chart shown in FIG. 7, the control circuit 301 is operative to control the scanning of respective X and Y loop coil groups 16 and 17 in the tablet 1 through the scanning circuits 303x and 303y, and controls the X/Y switching circuit 305 and the signal receiving timing switching circuit 306 to effect time-sharing drive of the loop coils. The control circuit 301 further operates to effect analog-to-digital conversion (A/D conversion) of output signals from the low pass filters 309, 312 and 313 and to effect arithmetic processing so as to determine or calculate the coordinate value of designated point inputted by the pen 2 and so as to recognize the ON/OFF state of pen switch. These processed data are fed to a host computer (not shown).

The scanning circuit 303x operates to sequentially select individual loop coils of the X loop coil group 16, and the other scanning circuit 303y operates to sequentially select individual loop coils of the Y loop coil group 17. These scanning circuits 303x and 303y are controlled under the command of control circuit 301.

The transmitting/receiving switching circuit 304x operates to connect a selected loop coil of the X group 16 alternately to either of the driving circuit 314x and amplifier 315x, and the other transmitting/receiving switching circuit 304y operates to connect a selected loop coil of the Y group 17 alternately to either of the driving circuit 314y and amplifier 315y. These switching circuits 304x and 304y are controlled in response to a transmitting/receiving switching signal B.

Figure 6:
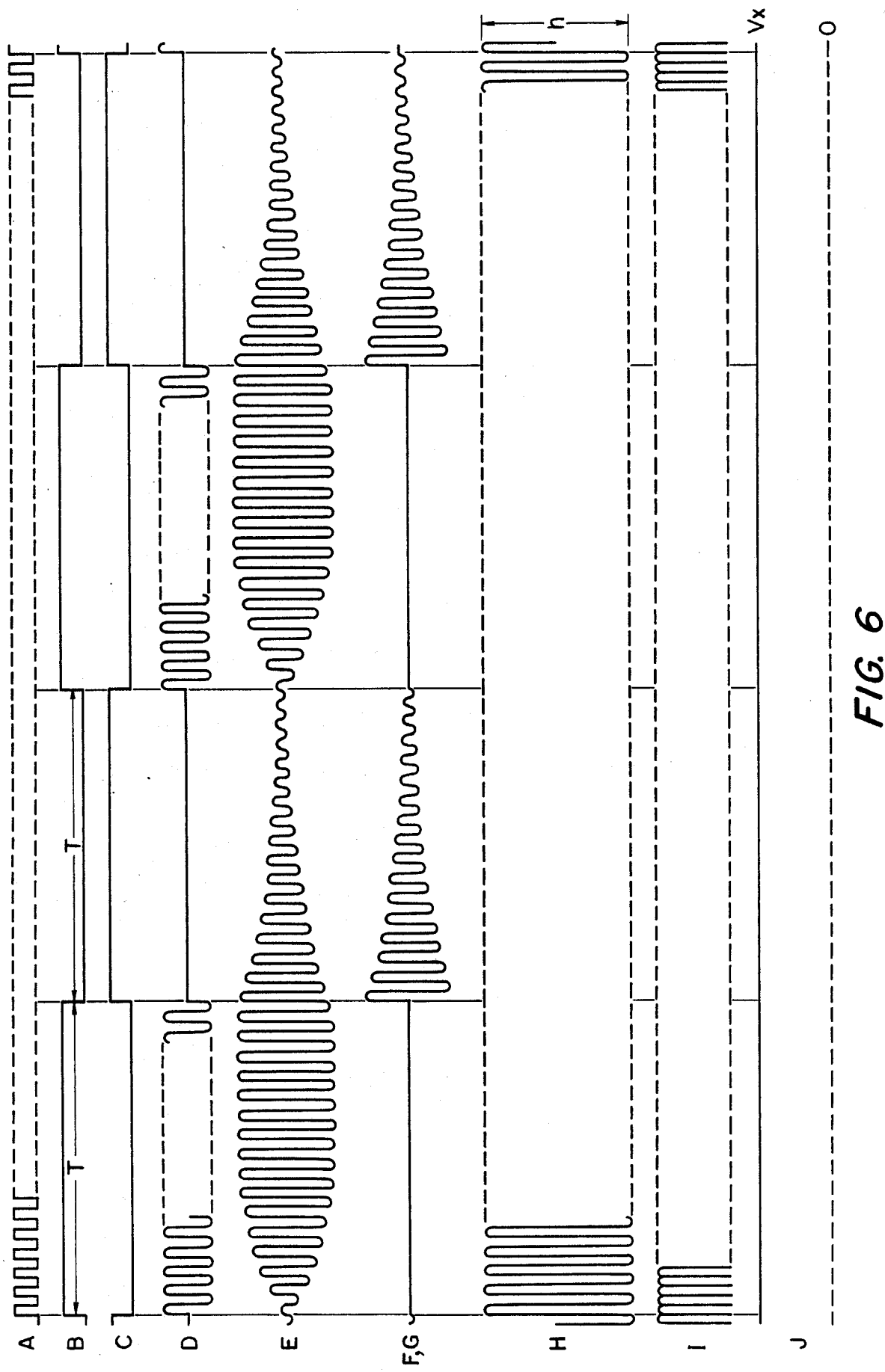
FIG. 6 is a waveform diagram of the FIG. 5 circuits.

The control signal generating circuit 302 generates various control signals under the command of control circuit 301, including, as shown in FIG. 6, an oscillating signal A having a rectangular waveform and the predetermined frequency fo of, for example, 500 kHz, another oscillating signal A' (not shown in FIG. 6) having a phase delayed from that of the signal A by a given phase angle, the transmitting/receiving switching signal B having frequency fk of, for example, 15.625 kHz, and a receiving timing signal C. The oscillating signal A is fed to the phase detector 310, and fed to a low pass filter (not shown) in which the rectangular signal A is shaped into a sine wave signal. The shaped signal A is selectively fed through the X/Y switching circuit 305 to either of the driving circuits 314x and 314y. The other oscillating signal A' is fed to the phase detector 311. Further, the transmitting/receiving switching signal B is fed to the respective transmitting/receiving switching circuits 304x and 304y, and the receiving timing signal C is fed to the receiving timing switching circuit 306.

Now, when the control circuit 301 commands the X/Y switching circuit 305 and the receiving timing switching circuit 306 to select drive of the X loop coil group, the shaped oscillating signal A of sine waveform is applied to the driving circuit 314x in which the shaped oscillating signal A is converted into the corresponding balanced or AC signal, and then fed to the transmitting/receiving switching circuit 304x. Since the switching circuit 304x operates to selectively and alternately connect either of the driving circuit 314x and the amplifier 315x to the scanning circuit 303x in response to the transmitting/receiving switching signal B, the scanning circuit 303x receives from the switching circuit 304x a driving signal D having a period $2T = 1/fk = 1/15.625$ kHz $= 64$ $\mu$sec, in which first half duration $T = 32$ $\mu$sec of each period contains 500 kHz AC signal and the second half duration $T = 32$ $\mu$sec of the same period contains no signal.

The driving signal D is sequentially selectively applied to an individual loop coil 16-i ($i = 1, 2, \ldots, 48$) of the X group by means of the scanning circuit 303x so that the individual loop coil 16-i locally transmits an electromagnetic wave signal of 500 kHz for the first duration of T due to electromagnetic induction based on the driving signal D.

At this state, when the pen 2 is held erectly on the tablet 1 during the use thereof, the transmitted wave signal is received by the coil 252 in the pen 2 so as to activate the coil 252 to thereby induce in the resonating circuit 25 an AC voltage E in synchronization with the driving signal D.

Then, the driving signal D shifts to its second half duration T which contains no AC signal and defines a receiving duration, and concurrently the selected individual loop coil 16-i is switched to the amplifier 315x through the transmitting/receiving switching circuit 304x. Thus, the selected loop coil 16-i immediately stops transmitting the electromagnetic wave, while the induced voltage E is gradually damped due to dissipation in the resonating circuit 25.

On the other hand, in the pen 2, the resonating circuit 25 circulates therethrough induced current caused by the induced voltage E, effective to activate the coil 252 to transmit a responding electromagnetic wave signal. This responding electromagnetic wave signal is received reversely by and therefore returned to the selected loop coil 16-i to activate the same to thereby induce a voltage in the loop coil 16-i. This induced voltage is fed to the amplifier 315x through the transmitting/receiving switching circuit 304x only during the receiving duration T to thereby produce an amplified AC detection signal F which is fed to the receiving timing switching circuit 306.

The receiving timing switching circuit 306 receives the AC detection signal F from either of the amplifiers 315x and 315y (at this stage, from the amplifier 315x)

and the receiving timing signal C which has actually an inverse form of the transmitting/receiving switching signal B. The switching or gating circuit 306 operates during the duration in which the signal C is held high (H) level to gate the AC detection signal F and operates during the other duration in which the signal C is held low (L) level to block the signal F so that the gating circuit 306 outputs an AC detection signal G (substantially identical to the signal F).

The AC detection signal G is fed to the band pass filter 307. The filter 307 is comprised of a ceramic filter having its natural frequency fo such that the filter 307 successively filters or analyzes the AC detection signal G from the selected loop coil to produce a pure AC detection signal H having amplitude h corresponding to the energy level of the fo frequency component contained in the successive signals G (stricty speaking, several number of signals G are fed to the filter 307 in partly overlapping relation and outputted therefrom in an averaged state). The pure AC detection signal H is then fed to the detector 308 and to the phase detectors 310 and 311.

The signal detector 308 operates to detect and rectify the signal H to produce a rectified detection signal I. Then, the low pass filter 309 having a sufficiently low cutoff frequency converts the rectified detection signal I into a DC detection signal J which has a magnetic voltage level Vx which is about half of the amplitude h of the signal H. Thereafter, the DC detection signal J is fed to the control circuit 301.

The voltage level Vx of signal J depends on the distance $\bar{d}$ between the pen 2 and the selected coil 16-i along the tablet and, in this embodiment, is inversely proportional to approximately $\bar{d}^4$. Therefore, the voltage level Vx changes during the scanning of loop coils. The control circuit 301 converts the analog voltage level Vx into the corresponding digital value for each of the loop coils, and arithmetically processes the obtained digital values to thereby calculate the X coordinate value of the given point designated by the pen 2. In similar manner, the Y coordinate value of the same given point is calculated by the microprocessor 301.

On the other hand, the phase detector 310 receives the oscillating signal A as a reference signal. When the switch 251 of pen 2 is held in the OFF state, and therefore the phase of detection signal H is approximately matched to that of reference signal A, the phase detector 310 outputs a switch detection signal which has a positively inverse form of the signal H (therefore, actually identical to the signal I). This switching detection signal is converted by the low pass filter 312 into a DC switching detection signal having a voltage level half of the amplitude h (actually, identical to the signal J). The converted DC switching detection signal is then applied to the control circuit 301.

Further, the other phase detector 311 is supplied with the oscillating signal A' as a reference signal. As described above, when the switch 251 is held in the OFF state, and therefore the phase of the signal H advances relative to that of reference signal A' by the given phase angle, the phase detector 311 outputs another switching detection signal which has positive and negative components. This switching detection signal is converted by means of the low pass filter 313 into a DC switching detection signal which is fed to the control circuit 301. Since the phase detector 311 outputs the AC switching detection signal having the positive and negative components, the low pass filter 313 outputs the DC signal having voltage level considerably smaller than that of the DC signal outputted from the low pass filter 312.

On the other hand, when the switch 251 of pen 2 is switched to the ON state, the phase of the induced current flowing through the resonating circuit 25 is delayed from that of the induced voltage signal E so that the phase of primary detection signal F is also delayed by the given phase angle. Namely, the phase of the detection signal F is approximately matched to that of the oscillating signal A'. Accordingly, the signal H outputted from the band pass filter 307 is converted by means of the phase detector 310 into a switching detection signal having positive and negative components, and the low pass filter 312 outputs a DC switching detection signal having the voltage level approximately identical to that of the DC switching detection signal outputted from the low pass filter 313 outputted when the switch 251 is held OFF in the state. On the other hand, the same signal H is converted by the phase detector 311 into a DC switching detection signal inverted to the positive side, and therefore the low pass filter 313 outputs a DC switching detection signal having the voltage level about half of the amplitude h in a similar manner as described before.

In this manner, the low pass filter 312 operates when the switch 251 is held in the OFF state to output the DC switching detection signal of the given voltage level, and the low pass filter 313 operates when the switch 251 is held in the ON state to output the DC switching detection signal having the given voltage level. The control circuit 301 monitors the output voltage levels of low pass filters 312 and 313 so as to discriminate whether the switch 251 is held in the OFF or ON state. The recognized information of whether the switch 251 is OFF or ON is utilized, for example, to specify points to be actually inputted into the tablet among the points designated by the tip end of the pen 2.

Lastly, the description is given to explain how the coordinate value is determined and how the OFF/ON state of the pen is recognized in the processing circuit 3 with reference to FIGS. 7 to 10. At first, the digitizer is powered and set for digitization operation. The control circuit 301 commands the X/Y switching circuit 305 and the receiving timing switching circuit 306 to carry out the driving of X loop coil group 16, and commands the scanning circuit 303x to select the first loop coil 16-1 out of the 48 number of loop coils 16-1 to 16-48 of the X loop coil group 16. Then, the first loop coil 16-1 is connected to the transmitting/receiving switching circuit 304x.

The switching circuit 304x operates to alternately connect the loop coil 16-1 to either of the driving circuit 314x and the amplifier 315x in response to the transmitting/receiving switching signal B which defines the transmitting duration of 32 μsec and the receiving duration of 32 μsec within each period. As shown by the first waveform in FIG. 8, the driving circuit 314x feeds 16 number of peaks of the 500 kHz oscillating sine wave signal to the first loop coil 16-1 during the transmitting duration. As shown in the second waveform of FIG. 8, the switching between the transmitting and receiving operations is repeatedly carried out seven times for each loop coil, for example, for the first loop coil 16-1 in this case. Thus the selecting period of 64 μsec×7=448 μsec is assigned to each loop coil so as to carry out repeatedly the transmitting/receiving switching operation seven times.

The amplifier 315x receives successively 7 number of the induced voltage detection signals for each loop coil during seven times of the intermittent receiving durations. These trains of voltage detection signals are fed to the band pass filter 307 through the receiving timing switching circuit 306 and processed into the averaged waveform of the detection signal as described before. The averaged detection signal is passed through the detector 308, phase detectors 310 and 311, and low pass filters 309, 312 and 313 to the control circuit 301. The control circuit 301 converts the analog DC detection signal outputted from the low pass filter 309 into the corresponding digital data $V_{x1}$ which depends on the distance between the pen 2 and the first loop coil 16-1, and which is stored in the control circuit 301.

Figure 8:
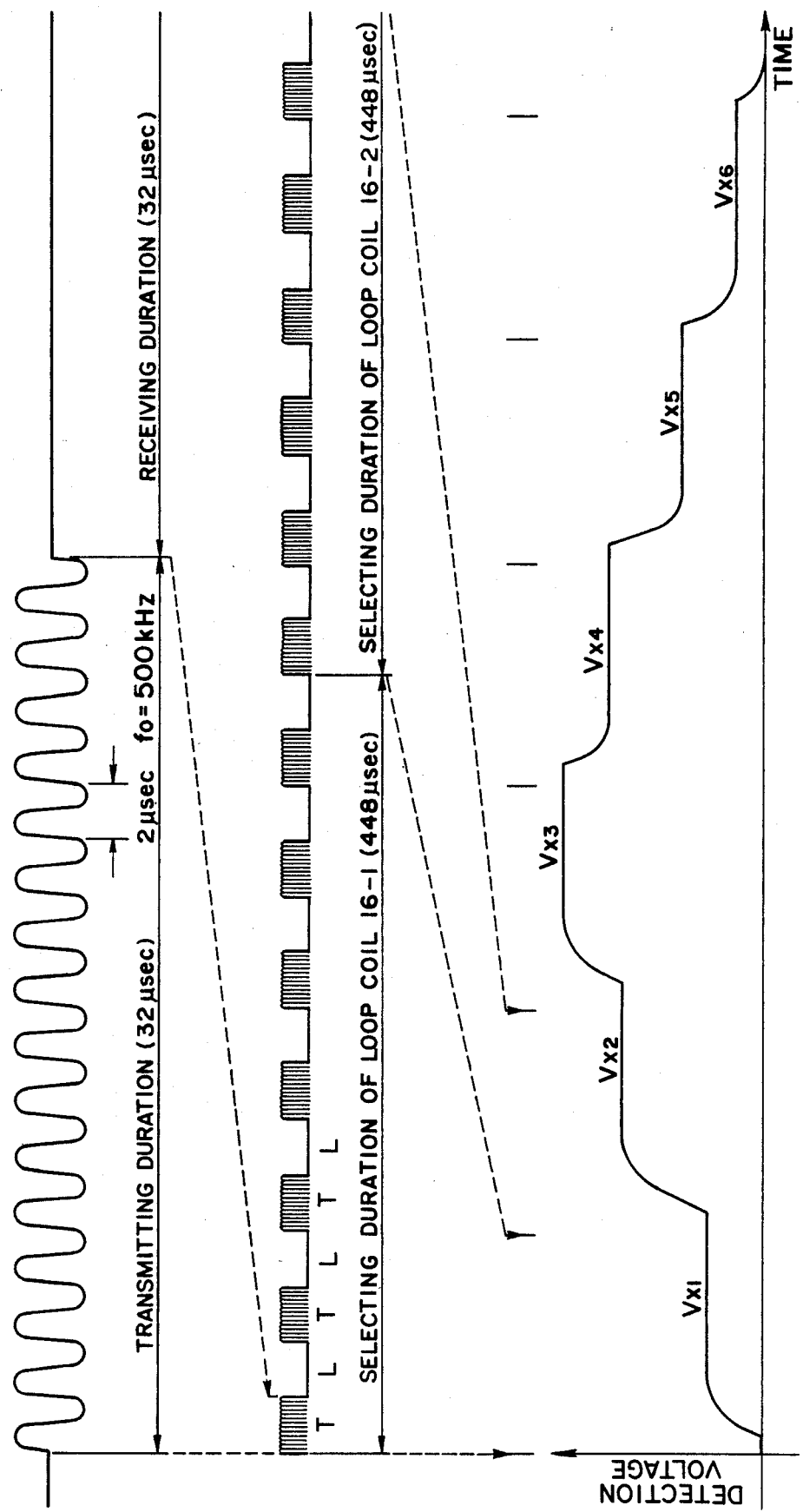
FIG. 8 is a timing chart illustrating the basic operation of determination of coordinates of designated point in the processing circuit.

Next, the control circuit 301 commands the scanning circuit 303x to select the second loop coil 16-2 such that the second loop coil 16-2 is connected to the transmitting/receiving switching circuit 304x. Then, in similar manner, the control circuit 301 receives the DC detection voltage signal $V_{x2}$ depending on the distance between the pen 2 and the second loop coil 16-2 and memorizes the corresponding digital data. Thereafter, in similar manner, the loop coils 16-3 to 16-48 are sequentially connected to the transmitting/receiving switching circuit 304x. Finally as shown in the third waveform of FIG. 8, the digital data of DC detection voltage signals $V_{x1}$ to $V_{x48}$ are stored in the control circuit 301 (the third waveform of FIG. 8 represents a part of the DC detection voltage signals in analog form).

Figure 9:
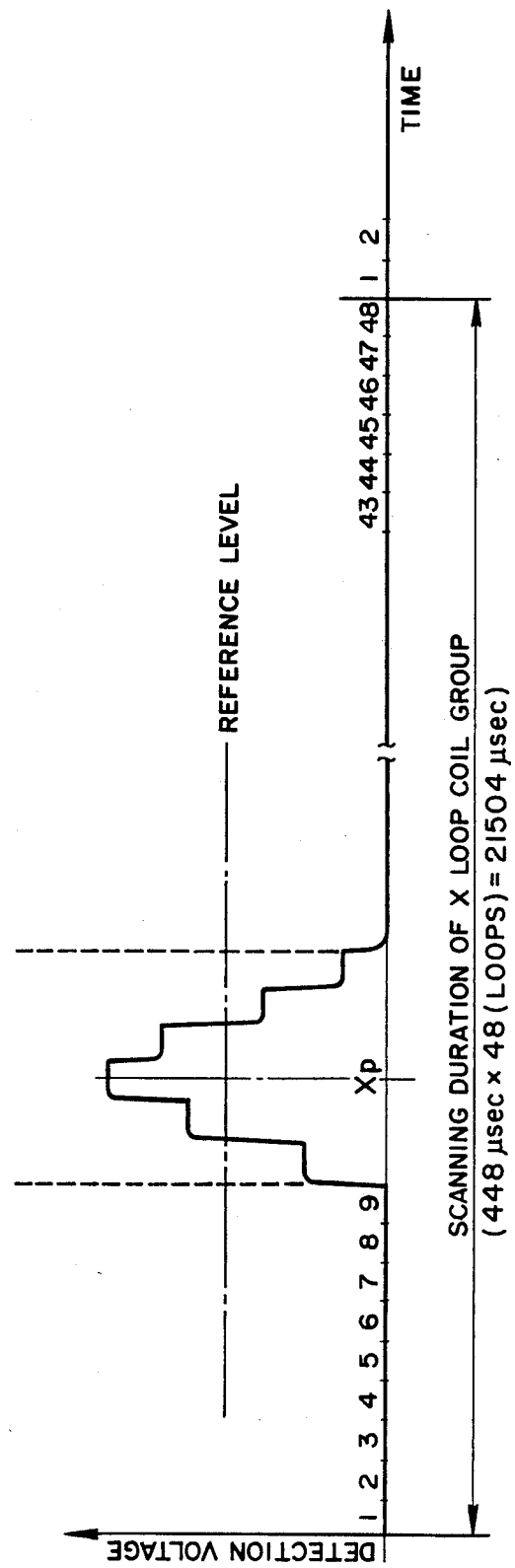
FIG. 9 is a diagram showing detection voltages outputted from the loop coils of flat sensor for the first cycle of the point detection operation.

As shown in FIG. 9, the DC detection signals are developed in several number of loop coils around the designated point ($X_p$) pointed by the pen 2. The control circuit 301 determines whether the memorized data value of detection voltage signal exceeds a predetermined reference level or not. If the data value is below the reference level, the control circuit 301 again carries out the scanning of the X loop coil group and checks the DC detection voltage level until it exceeds the reference level.

Next, the control circuit 301 commands the X/Y switching circuit 305 and the receiving timing switching circuit 306 to carry out the driving of the Y loop coil group 17. In similar manner as described before, the scanning circuit 303y and the transmitting/receiving switching circuit 304y are operated to transmit and receive the electromagnetic wave signal. The output signal of low pass filter 309 is subjected to the A/D conversion to obtain the digital data representative of the detection voltages which depend on the distance between the pen 2 and the respective ones of the Y loop coils 17-1 to 17-48. Thereafter, the voltage level of DC detection signal is checked as before. If the voltage level is below the predetermined reference level, again the Y loop coil group is scanned and the detection voltage is checked. On the other hand, if the detection voltage level is above the predetermined reference level, the control circuit 301 processes the stored digital data representative of the detection voltages to calculate the coordinate value (X, Y) of the designated point inputted by the pen 2.

Next, the control circuit 301 commands the scanning circuit 303x (or 303y) to select a specific loop coil which has produced the maximum detection voltage among the X loop coils 16-1 to 16-48 (or from the Y loop coils 17-1 to 17-48). The transmitting and receiving operations are repeatedly carried out for several times, for example, seven times with respect to the selected coil.

At this time, the low pass filters 312 and 313 output the analog DC switching detection signals, and the control circuit 301 carries out the A/D conversion of these switching detection signals to obtain the corresponding digital switching data. The digital switching data are checked as to which of the data exceeds the predetermined level to recognize the ON/OFF state of the switch 251. The result of recognition of the ON/OFF state of pen 2 is transferred to the host computer together with the coordinate value (X, Y) of the designated point.

Figure 10:
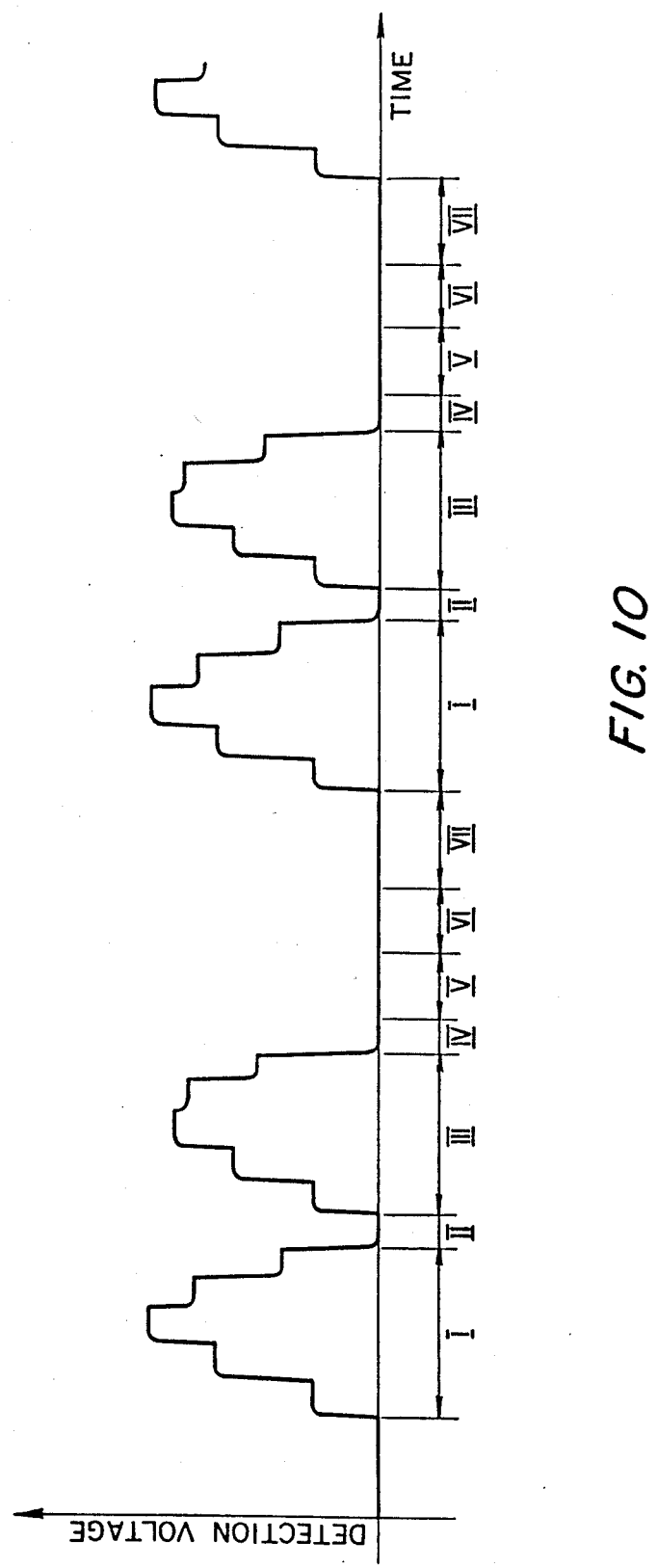
FIG. 10 is a timing chart illustrating subsequent cycles of point detection operation and coordinate determination operation.

After the determination of the coordinate value and the recognition of the pen switch state are completed for the first cycle, the control circuit 301 conducts the second cycle of coordinate value determination operation as shown in FIG. 10. Namely, the control circuit 301 commands the scanning circuit 303x to scan a part of the X loop coils 16-1 to 16-48, for example, ten number of loop coils on both sides of the specific loop coil which has produced the maximum detection voltage in the first cycle of operation, and commands the other scanning circuit 303y to scan ten number of the Y loop coils in similar manner. Then, the control circuit 301 processes the digital data obtained in a manner similar to the first cycle of operation to effect the determination of update coordinate value of the designated point and the discrimination of the pen switch ON/OFF state. The result is transferred to the host computer, and thereafter the control circuit 301 sequentially carries out the subsequent cycle of operation.

A detailed description is next given for the detection voltage level check. The control circuit 301 checks whether the maximum value of the detection voltage exceeds the given reference level and which of the loop coils has generated the maximum detection voltage. If the maximum detection voltage is below the reference level, the control circuit 301 stops the subsequent operation including the determination of coordinate value. In turn, the control circuit 301 shifts to the next cycle of operation, in which the central loop coil is set among the loop coils to be scanned.

The arithmetic methods of determining the coordinate value (X, Y) for the designated point xp includes a method such that the waveform of detection voltages $V_{x1}$ to $V_{x48}$ is approximated by an appropriate function around the maximum detection voltage so as to determine the coordinate value of the peak point of the function. For example, in the third waveform of FIG. 8, the curve containing the maximum detection voltage $V_{x3}$ and the adjacent detection voltages $V_{x2}$ and $V_{x4}$ are approximated by a quadratic function so as to calculate the coordinate value xp of the designated point. Provided that the center coordinate values of respective X loop coils 16-1 to 16-48 are represented by x1 to x48, respectively, and the pitch of X loop coils is represented by $\Delta x$, the respective detection voltages $V_{x2}$, $V_{x3}$ and $V_{x4}$ are represented by the following relations:

$$V_{x2} = a(x2 - xp)^2 + b \qquad 1$$

$$V_{x3} = a(x3 - xp)^2 + b \qquad 2$$

$$V_{x4} = a(x4 - xp)^2 + b \qquad 3$$

where a and b are constants (a<0). Further, the following relations are established:

$$x3 - x2 = \Delta x \qquad 4$$

$$x4 - x2 = 2\Delta x \qquad 5$$

The relations 4 and 5 are introduced into the relations 2 and 3 to make the determining relation:

$$xp = x2 + \Delta x/2 \cdot \{(3V_{x2} - 4V_{x3} + V_{x4})/(V_{x2} - 2V_{x3} + V_{x4})\} \qquad 6$$

Consequently, in order to calculate the coordinate value xp of the designated point, the maximum detection voltage data and the pair of adjacent detection voltage data are extracted from the 48 number of detection voltage data $V_{x1}$ to $V_{x4}$ according to the detection voltage check, and the coordinate value of a loop coil immediately preceding the specific loop coil which has produced the maximum detection voltage is determined. Then, the calculation is carried out according to the relation 6 using the thus extracted detection voltage data and thus determined coordinate value so as to compute the X coordinate value xp of the designated point.

As described above, the pen is not needed to connect with the tablet through a cable to thereby provide easily operable digitizer.

The number of loop coils and the arrangement thereof in the disclosed embodiment are of only one example, and the invention is not limited to the disclosed embodiment. Though the shielding plate is attached in contact with the flat sensor in the embodiment, the shielding plate may be disposed separately from the flat sensor at an appropriate distance. Further, the present invention can be applied to another type of the digitizer disclosed in Japanese patent application, publication number 176133/1985.

As described above, according to the present invention, the shielding plate is disposed under the flat sensor of the tablet to block influences caused by external disturbing electromagnetic waves and geomagnetism. The shielding plate is composed of silicon steel containing 4.0 to 7.0 weight % of silicon such that the shielding plate does not cause the substantial attenuation of the electromagnetic wave signal or magnetic flux transmitted between the pen and the flat sensor so that the shielding plate can be disposed in contact with the flat sensor. Accordingly, the thickness of the tablet can be reduced considerably as compared to the conventional one to thereby provide a thin and compact tablet.

Further, in the inventive digitizer, the sensor plate and the magnetic shielding plate are attached in contact with each other or disposed closely with each other with a spacing of 1 mm to 5 mm so as to reduce considerably the thickness of the tablet. For example, in the FIG. 2B embodiment, the total thickness of the tablet including the top frame and bottom plate can be set in the range of 3-5 mm. Accordingly, such a tablet can be compactly assembled into, for example, a portable compuct computer of notebook type having digitization function.

What is claimed is:

1. A digitizer for determining a coordinate value of a point designated on a given two-dimensional coordinate plane, comprising: a pointing instrument manually operable to designate a point on the given two-dimensional coordinate plane; a tablet including a flat sensor defining the given two-dimensional coordinate plane and operative for transmitting a magnetic signal between the flat sensor and the pointing instrument disposed thereon for detecting the designated point to thereby produce a detection signal, and a shielding plate disposed under the flat sensor for magnetically shielding the flat sensor, the shielding plate being composed of silicon steel containing 4.0 to 7.0 weight % of silicon; and a processing circuit connected to the flat sensor for processing the detection signal to determine the coordinate value of the designated point.

2. A digitizer according to claim 1; wherein the tablet has multi-layer structure comprised of the flat sensor and the shielding plate disposed in contact with the flat sensor.

3. A digitizer according to claim 1; wherein the silicon steel contains a metal additive selected from the group consisting of Ni, Co and Al.

4. A digitizer according to claim 1; wherein the pointing instrument includes therein an isolated resonating circuit receptive of the magnetic signal in the form of an electromagnetic wave signal transmitted locally from the flat sensor for emitting a responding and resonating electromagnetic wave signal locally to the flat sensor.

5. A digitizer according to claim 4; wherein the flat sensor includes a plurality of loop coils arranged along X and Y directions related to the two-dimensional coordinate plane and selectively driveable to transmit the electromagnetic wave signal and to receive the responding and resonating electromagnetic wave signal to thereby produce sequentially detection signals.

6. A digitizer according to claim 5; wherein the processing circuit includes scanning means for scanning the loop coils to selectively and sequentially drive the same, and processing means for arithmetically processing the detection signals to determine the coordinate value of the designated point.

7. A digitizer according to claim 6; wherein the processing circuit includes driving means for applying an AC signal having a specific frequency effective to activate the resonating circuit to the selected one of loop coils to thereby enable the selected loop coil to transmit the electromagnetic wave signal, and switching means for switching the selected loop coil from a transmitting state to a receiving state to thereby enable the selected loop coil to receive the responding and resonating electromagnetic wave signal effective to induce the detection signal in the selected loop coil.

8. A digitizer according to claim 4; wherein the resonating circuit includes a manually operable switch effective to change the phase of the responding and resonating electromagnetic wave signal, and the processing circuit includes means for detecting the phase change to thereby discriminate the ON/OFF state of the switch, which is indicative of whether the processing circuit should calculate the coordinate value of the designated point.

9. A tablet for producing a detection signal in response to designation of a point thereon, comprising: a flat sensor having a bottom face, a top face defining a predetermined two-dimensional coordinate plane and loop coils disposed between the bottom and top faces for detecting a magnetically designated point on the two-dimensional coordinate plane and producing a corresponding detection signal indicative of the coordinate value of the designated point; and a shielding plate disposed under the bottom face of the flat sensor for magnetically shielding the flat sensor, the shielding plate being composed of silicon steel containing 4.0 to 7.0 weight % of silicon.

10. A tablet according to claim 9; including supporting means for supporting the flat sensor and the shielding plate in contact with each other.

11. A tablet according to claim 9; including supporting means for supporting the flat sensor and the shielding plate with a spacing less than 5 mm.

12. A tablet according to claim 11; wherein the supporting means includes a cushion plate interposed in the spacing.

13. A tablet according to claim 11; wherein the supporting means includes means for setting the spacing less than 3 mm.

14. A tablet according to claim 11; wherein the supporting means includes means for setting the spacing less than 1 mm.

* * * * *